United States Patent
McKinnon et al.

(10) Patent No.: US 9,633,042 B2
(45) Date of Patent: Apr. 25, 2017

(54) OBJECT RECOGNITION TRAIT ANALYSIS SYSTEMS AND METHODS

(71) Applicant: Nant Holdings IP, LLC, Culver City, CA (US)

(72) Inventors: David McKinnon, Culver City, CA (US); John Wiacek, Culver City, CA (US); Jeremi Sudol, Los Angeles, CA (US); Kamil Wnuk, Playa Del Rey, CA (US); Bing Song, La Canada, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 98 days.

(21) Appl. No.: 14/636,161

(22) Filed: Mar. 2, 2015

(65) Prior Publication Data

US 2015/0254510 A1 Sep. 10, 2015

Related U.S. Application Data

(60) Provisional application No. 61/946,650, filed on Feb. 28, 2014.

(51) Int. Cl.
*G06F 17/30* (2006.01)
*G06K 9/68* (2006.01)
*G06K 9/00* (2006.01)

(52) U.S. Cl.
CPC ... *G06F 17/30244* (2013.01); *G06K 9/00684* (2013.01); *G06K 9/6807* (2013.01)

(58) Field of Classification Search
CPC .......... G06F 17/30244; G06K 9/00684; G06K 9/6807
See application file for complete search history.

(56) References Cited

U.S. PATENT DOCUMENTS 6,711,293 B1 3/2004 Lowe
6,894,639 B1 5/2005 Katz
(Continued)

FOREIGN PATENT DOCUMENTS

KR 10-2012-0032897 A 4/2012

OTHER PUBLICATIONS

International Search Report and Written Opinion issued in International Patent Application No. PCT/US2015/018369 dated May 29, 2015.

(Continued)

*Primary Examiner* — Siamak Harandi
*Assistant Examiner* — Menatoallah Youssef
(74) *Attorney, Agent, or Firm* — Mauriel Kapouytian Woods LLP; Elaine Lee; Michael Mauriel (57) ABSTRACT

A system for analyzing scene traits in an object recognition ingestion ecosystem is presented. In some embodiment, a trait analysis engine analyzes a digital representation of a scene to derive one or more features. The features are compiled into sets of similar features with respect to a feature space. The engine attempts to discover which traits of the scene (e.g., temperature, lighting, gravity, etc.) can be used to distinguish the features for purposes of object recognition. When such distinguishing traits are found, an object recognition database is populated with object information, possibly indexed according to the similar features and their corresponding distinguishing traits.

25 Claims, 5 Drawing Sheets

(56) References Cited

U.S. PATENT DOCUMENTS

| | | |
|---|---|---|
| 8,145,677 B2 | 3/2012 | Al-Shameri |
| 8,305,575 B1 | 11/2012 | Goldstein et al. |
| 8,306,257 B2 | 11/2012 | Shiell et al. |
| 8,422,994 B2 | 4/2013 | Rhoads et al. |
| 8,429,153 B2 | 4/2013 | Birdwell et al. |
| 8,489,115 B2 | 7/2013 | Rodriguez et al. |
| 8,570,319 B2 | 10/2013 | van Baar et al. |
| 8,581,905 B2 | 11/2013 | Mitchell |
| 2004/0221237 A1* | 11/2004 | Foote ............... G06F 17/30814 715/700 |
| 2005/0069207 A1 | 3/2005 | Zakrzewshi et al. |
| 2011/0143811 A1* | 6/2011 | Rodriguez ......... G06K 9/00986 455/556.1 |
| 2011/0229025 A1 | 9/2011 | Zhao et al. |
| 2011/0244919 A1 | 10/2011 | Aller et al. |
| 2013/0266195 A1 | 10/2013 | Shiell et al. |

OTHER PUBLICATIONS

Kurz et al., "Gravity-Aware Handheld Augmented Reality," 10th IEEE International Symposium on Mixed and Augmented Reality, Oct. 26, 2011, pp. 111-120, IEEE, Basel, CH.

Kurz et al., "Inertial Sensor-Aligned Visual Feature Descriptors," 2011 IEEE Conferene on CVPR, Jun. 20, 2011, pp. 161-166, IEEE, Washington, D.C.

Ozuysal et al., "Fast Keypoint Recognition in Ten Lines of Code," 2007 IEEE Conference on CVPR, Jun. 18, 2007, pp. 1-8, Minneapolis, MN.

\* cited by examiner

OBJECT RECOGNITION TRAIT ANALYSIS SYSTEMS AND METHODS

CROSS REFERENCE TO RELATED APPLICATIONS

This application claims the benefit of U.S. Provisional Application No. 61/946,650, filed Feb. 28, 2014. The entire content of that application is hereby incorporated herein by reference.

BACKGROUND

The field of the invention is object recognition trait analysis technologies.

The following background description includes information that may be useful in understanding the present invention. It is not an admission that any of the information provided herein is prior art or relevant to the presently claimed invention, or that any publication specifically or implicitly referenced is prior art.

Image-based object recognition technologies rely heavily on recognition algorithms that extract features from images. For example, U.S. Pat. No. 6,711,293 to Lowe titled "Method and Apparatus for Identifying Scale Invariant Features in an Image and Use of Same for Locating an Object in an Image", filed Mar. 6, 2000, describes an algorithm, Scale Invariant Feature Transform (SIFT), that generates scale invariant features in the form of descriptors. Unfortunately, the invariance of the descriptors can lead to problems. If an object or set of objects comprises very similar or repetitious features, then the generated descriptors will be very similar to each other thereby reducing their object discriminating capabilities. Further, in image data representative of complex scenes or environments having many objects, such algorithms could result in thousands of descriptors, which could include many false positive matches to known objects.

Others have put forth effort to identify how to discriminate objects based on a variance within the image data itself. For example, U.S. Pat. No. 8,306,257 to Shiell et al. titled "Hierarchical Tree AAM", filed Jan. 31, 2011, leverages a variance measure with respect to a model image to determine how to divide sets of images among nodes of a tree where the variance of images is with respect to an image model. Further progress is made by U.S. Pat. No. 6,894,639 to Katz titled "Generalized Hebbian Learning for Principal Component Analysis and Automatic Target Recognition, Systems and Methods", filed Dec. 18, 1991. Katz describes using selected target specific feature information to distinguish targets from background clutter in image data. Katz leverages variances in image features via principle component filters to separate targets. Interestingly, Katz only focuses on deriving variances with respect to data available only from image data. Still, such principle component filters would fail in a case where there are a large number of objects having very similar features; bricks in a wall for example.

Additional progress has been made by combining gravity information with features as discussed in Kurz et al. titled "Gravity-Aware Handheld Augmented Reality" (Proc. IEEE and ACM International Symposium on Mixed and Augmented Reality (ISMAR2011), pp. 111-120, Basel, Switzerland, 2011) and in Kurz et al. titled "Inertial sensor-aligned visual feature descriptors" (Proc. IEEE Conference on Computer Vision and Pattern Recognition (CVPR2011), pp. 161-166, Colorado Springs, USA, 2011.). Using gravity information provides, at least at some level, an ability to distinguish similar descriptors; descriptors generated from corners of a window for example All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY

Although Kurz provides techniques for leveraging gravity information combined with features for providing proper orientation of augmented reality (AR) content, Kurz fails to appreciate that one environment can vary substantially from another environment on an environmental trait by environmental trait basis. Thus, scenes or environments can have numerous differing traits, which might also be useful for object discrimination. What is still needed are techniques that provide for discovering which traits in an environment or scene would offer further object discriminating power to recognition features.

The inventive subject matter provides apparatuses, systems and methods in which one or more computing devices discover scene attributes that help enhance feature-based object recognition. In some embodiments, features are derived from a digital representation of an image captured by an image sensor and traits are derived from scene trait sensor data, a particular set of scene trait sensor data being related to a particular digital representation by the time and scene at which the data was captured. One aspect of embodiments of the inventive subject matter includes an object recognition trait identification system that includes a trait analysis engine. In some embodiments, the system also includes a scene trait database. In some embodiments, the system also includes an object recognition system and corresponding object recognition database. The scene trait database is configured or programmed to store one or more scene traits that represent the properties of a scene or environment (e.g., lighting conditions, wireless field strengths, gravity, etc.). Each of the scene traits can have corresponding values (e.g., scalar, vector, etc.) within a scene attribute space. The trait analysis engine leverages the scene traits in an attempt to differentiate among similar object recognition features that are commonly associated with an object or with many objects. The trait analysis engine is configured to obtain a digital representation (e.g., images, video, sound, etc.) of an object in a scene and then apply one or more recognition algorithms to the digital representation to derive one or more features, where the features exist within a feature space. The engine further compiles a portion of the features into at least one similarity feature set, where the features within the similarity feature set are considered similar to each other according to a similarity measure (e.g., low variance, close proximity in the feature space, clustering, etc.). Although the features within the similarity feature set are considered similar to each other within the feature space, the engine analyzes the similar features with respect to one or more scene traits in the non-feature, scene attribute space thereby generating one or more trait variances with respect to known scene traits. The trait variances provide the engine sufficient information to select at least one trait as a distinguishing trait for the features in the similarity feature set. The features can then be stored in the object recognition database along with the distinguishing trait information. In alternative embodiments, scene trait analysis is applied to recognition of all objects across a plurality of scene captures, whether or not those objects are associated with descriptors in a similarity feature set.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The variouss servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The focus of the disclosed inventive subject matter is to enable construction or configuration of a computing device to operate on vast quantities of digital data, beyond the capabilities of a human. Although the digital data represents objects in a scene, it should be appreciated that the digital data is a representation of one or more digital models of such objects or scene, not the actual objects or scenes. Thus, the disclosed computing devices convert sensor data into a digital form that can be processed or operated on by digital processors. By instantiation of such digital models in the memory of the computing devices, the computing devices are able to manage the digital data or models in a manner that yield new capabilities beyond that of a human.

One should appreciate that the disclosed techniques provide many advantageous technical effects by leveraging scene traits data in an object recognition system. In particular, the disclosed techniques allow enhanced computer system performance so that fewer "false positives" are returned in response to object recognition search queries. Among other benefits, this allows processing of digital image searches to deliver results to end-user devices with greater accuracy and reduced latency.

Figure 1:
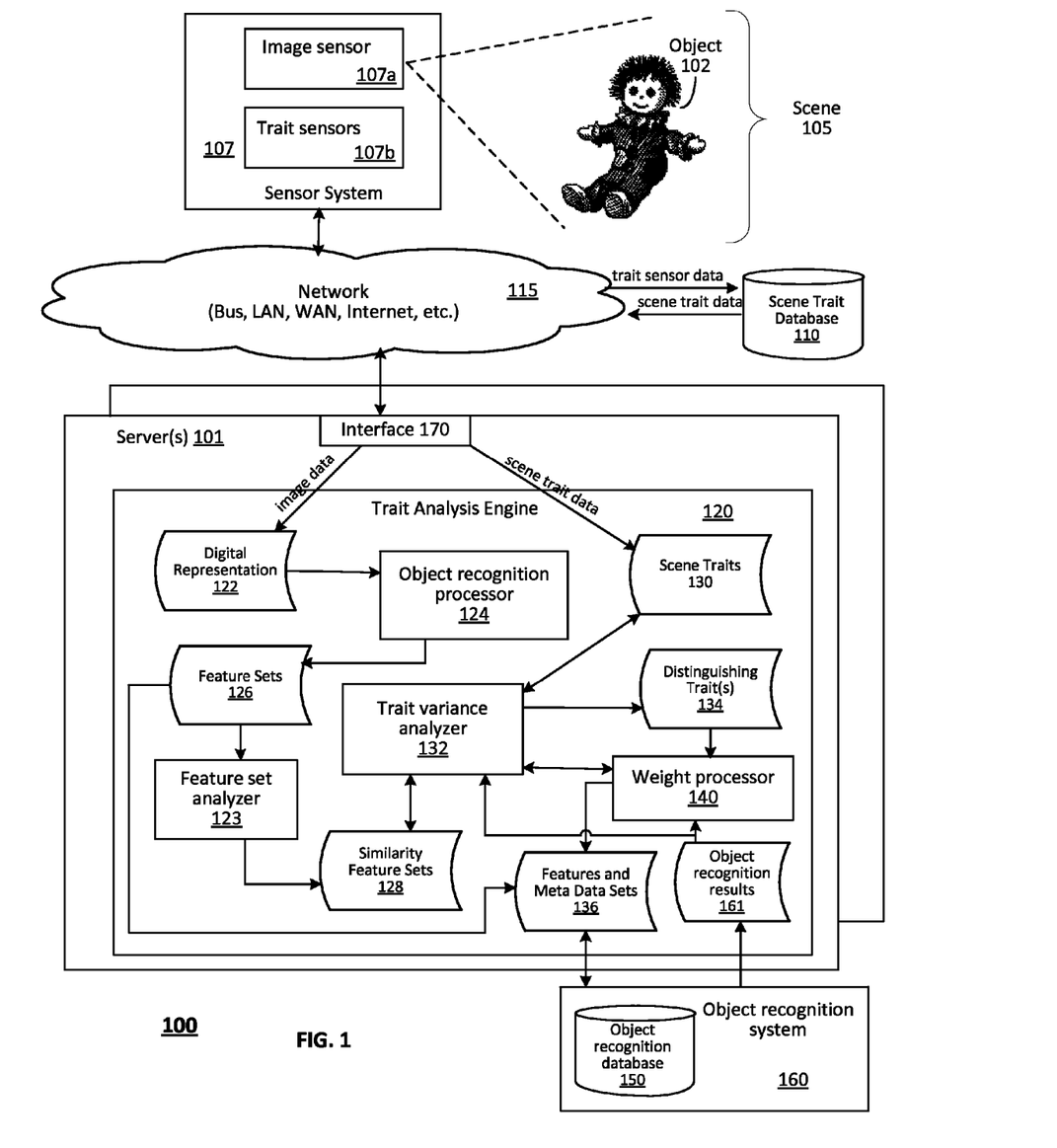
FIG. 1 is a schematic of an object recognition trait analysis system according to one embodiment of the present invention.

FIG. 1 illustrates an object recognition trait identification system 100 including trait analysis engine 120 according to one embodiment of the present invention. Trait analysis engine 120 represents a computing device or system that is configured or programmed to discover which traits of scene 105 offer object discriminating power to sets of similar features. In the illustrated embodiment, trait analysis engine 120 is implemented on one or more server computers 101. Identification system 100 can also include scene trait database 110, which is configured to store one or more scene traits 130 representative of scene 105. Still further, identification system 100 could also include one or more of object recognition system 160 and corresponding object recognition database 150. In one aspect, embodiments apply machine learning techniques to enhance trait analysis. In some embodiments, discovery is guided/enhanced based on feedback from object recognition results from the object recognition system. In other embodiments, discovery can be "unguided" based on trait variances alone and/or in relation to each other. This can be accomplished through particular systems and methods that leverage the relationship between scene traits and feature descriptors across multiple capture events associated with particular scenes, times, locations, depths, and, potentially, other parameters.

Sensor system 107 includes one or more sensors such as sensor 107a and one or more trait sensors such as trait sensor 107b. In the primary example illustrated herein, sensor 107a is an imaging sensor. However, in alternative embodiments, sensor 107a could be or also include other types of object sensors (e.g., a sound sensor and/or other sensors as described further below).

Scene 105 includes object 102. In this example, object 102 includes a toy. However, object 102 can be a broad spectrum of objects, possibly including, for example, a vehicle, a craft, an animal, a plant, a human, an appliance, a device, a document, a financial instrument, a game component, a poster, a newspaper, a magazine, on-screen content, or other types of objects. Further, multiple objects such as object 102, different from each other, can be present in scene 105 forming a complex environment. Scene 105 can also be considered to correspond to object data be ingested (i.e., analyzed, processed, and/or imported) to populate object recognition database 150 with known object information; descriptors, features, content, etc. One should appreciate that digital representation 122 of object 102 can be considered to include representations of an object type or class.

Scene 105 is associated with one or more scene traits 130 that represent the environment of scene 105. Each trait can be considered a dimension within a scene attribute space, possibly having one or more dimensions. For example, a scene trait might include the lighting of the scene. The scene trait can take on one or more values according to the corresponding trait. Lighting values might range from low lux values to high lux value for example. Other scene traits could include gravity information, magnetic fields, Wi-Fi signals (e.g., frequency, amplitude, phase, etc.), weather conditions (e.g., pressure, temperature, wind, etc.), or other traits that can describe a scene. When the traits take on specific values and are attached to known features, the trait values can aid in increasing the object resolving power of descriptors as discussed below.

In some embodiments, scene 105 exists within a controlled object ingestion environment where one or more scene traits 130 can be adjusted. Thus, scene traits 130 can take on values that are representative of a controlled environment setting (e.g., lighting, magnetic fields, etc.). Consider for example, a setting that can adjust magnetic fields to mimic locales on Earth. Thus, in some embodiments, scene traits such as magnetic fields can be considered an adjustable parameter of scene traits 130. Further, scene traits 130 can comprise data representative of ambient trait sensor data collected at scene 105, possibly collected by one or more of trait sensors 107b. Although the ambient sensor data could be collected locally (e.g., lighting information, etc.), it is also possible for scene traits 130 to represent external sensor data (e.g., weather data, etc.), perhaps temperature. Thus, although in the illustrated example, sensors 107b are housed within the same device as sensor 107a, it alternative embodiments, relevant trait information (e.g. weather captures via satellite) could be captured by and provided from sensor devices that are removed from scene 105.

Alternatively, scene traits 130 could just be assigned to scene 105 or object 102. For example, object 102, perhaps a work of art to be displayed in a public area, might be ingested so that consumers can use their smart devices to recognize it once it is on display. In such an example, scene traits 130 might include a single scene trait that corresponds to the location (e.g., GPS coordinates, triangulated location, etc.) of where object 102 will be displayed even though object 102 is not currently at that location.

Scene trait database 110 represents a data store configured or programmed to store scene traits 130 and their corresponding values. Although scene trait database 110 is illustrated as a database, it euphemistically represents various possible data stores. For example, scene trait database 110 could include a file stored in memory or on a disk drive where the file comprises the traits associated within scene 105 along with corresponding values. Thus, scene trait database 110 could include a file, a file system, a data structure in memory, a conventional database, or other storage system for later retrieval. Scene traits 130 comprise data objects or records in scene trait database 110. Further, scene trait database 110 can couple with trait analysis engine 120 over network 115. In alternative embodiments, scene trait database 110 can be part of or coupled more directly to trait analysis engine 120.

Sensor system 107 senses scene 105 to collect data that can be analyzed when ingesting object 102. In the example shown, sensor 107 system 107 includes image sensor 107a and one or more trait sensors 107b. In this example, imaging sensor 107a (e.g., camera, CCD, CMOS, etc.) is capable of capturing an image of object 102 as digital representation to be transmitted to and stored in server 101 as a digital representation 122. Sensors 107b sense traits associated with scene 105. In some examples, sensors 107a and/or 107b include various types of sensors such as including thermometers, Hall probes, accelerometers, acoustic sensors, transducers, ultrasound transducers, magnetometers, accelerometers, near field wireless sensor, Wi-Fi sensors, gyroscopes, biometric sensors, or other types of sensors. In view of the fact that sensor system 107 can include multiple sensors or even a broad spectrum of sensor types, digital representation 122 can comprise a wide variety of data modalities. Each modality of data would naturally correspond to the nature of a sensor in sensor system 107. Thus, digital representation 122 can comprise at least one or more of the following digital data modalities: image data, video data, audio data, 3D data, location data, time data, context data, biometric data, accelerometer data, medical data, game data, rates of change of one trait value versus another (e.g., dx/dy, $dx^2/d^2y$, $dx^3/d^3y$, $dx^4/dy^4$, etc.) or other data modalities.

In general, sensor system 107 captures image and trait data of various scenes over time and at different locations. Captured image and trait data are associated with a unique capture identifier (capture ID) that might, for example, be created using a combination of time and location information for corresponding to a time and place at which the image and trait data associated with scene 105 were captured. Sensor system 107 might, in one example, be a mobile device and the mobile device might capture scene 105 at various times and/or might capture different scenes comprising similar or different objects in different locations at different times.

Trait analysis engine 120 on one or more server devices 101 represents a computing device having roles or responsibilities to analyze digital representation 122 in order to ingest object 102 for future recognition purposes. In some embodiments, trait analysis engine 120 includes one or more hardware and software modules that provide the necessary functionality described herein. For example, trait analysis engine 120 can include or be implemented within a computer system having one or more network and/or other interfaces such as interface 170 through which it obtains digital representation 122 over a network such as network 115. A network interface such as interface 170 could include a wired interface, a wireless interface, or other types of connections to sensor 107. Digital representation 122 could include a file, a serialized data stream (e.g., XML, JSON, YAML, etc.), raw data, or other forms of data.

Trait analysis engine 120 also includes an object recognition processing module 124 configured or otherwise programmed to process digital representations 122 to generate and store feature sets 126. Object recognition processor 124 may be configured to implement a selected one or more object recognition algorithms. For example, in some embodiments, recognition algorithms implemented by object recognition processor 124 target image data (e.g., still images, video frames, video, etc.). In addition to, or alternatively, recognition algorithms implemented by object recognition processor 124 target other data modalities including, for example, sound, audio, raw sensor data, or other types of data. Examples of recognition algorithms 124 that target image data could are: Scale-invariant feature transform (SIFT), Binary Robust invariant scalable key points (BRISK), Speeded Up Robust Features (SURF), FERNS, DAISY descriptors, Gradient location and orientation histogram (GLOH), features from accelerated segment test (FAST), optical character recognition (OCR), facial recognition, or other types of image data processing, including, but not limited to FREAK descriptors, HOG descriptors, BRIEF descriptors, Harris Corners descriptors, Edges descriptors, EOG descriptors or TILT descriptors. Non-image-based algorithms, such as sound-based algorithms could include voice recognition algorithms, phrase recognition algorithms, audio signature algorithms, Hidden Markov models, dynamic time warping, or other types of sound-based algorithms.

Object recognition processor 124 accepts at least a portion of a digital representation 122 as input and then generates a feature set 126 by applying an object recognition algorithm to the digital representation. As an example, consider the SIFT algorithm described in U.S. Pat. No. 6,711,293 to Lowe titled "Method and Apparatus for Identifying Scale Invariant Features in an Image and Use of Same for Locating an Object in an Image", filed Mar. 6, 2000. SIFT is applied to image data and yields features in the form of descriptors. Each descriptor could be considered to represent a histogram vector where each bin in the histogram (i.e., each value in the vector) represents a dimension in the SIFT descriptor space. Each recognition algorithm applied by object recognition processor 124 would likely have its own feature space in which its resulting features exist. For example, an audio recognition algorithm might yield a feature set having values corresponding to amplitude, phase, frequency, time, or other values. Such values would be different than image-based features or descriptors. The features within a feature set of feature sets 126 could include descriptors, key points, corners, signatures, envelopes, edges, edgels, edgelets, face features, text from OCR, or other types of features.

As discussed previously, feature set 126 can include features that are considered similar to each other. For example, object 102 might have one or more repeating patterns that give rise to many features having similar structure. With respect to SIFT-based image processing, similar SIFT descriptors might exist close to each other in the descriptor space, thereby offering little object discriminating power due to the similarity of the descriptors. However, by analyzing patterns of traits value variations associated with similar features captured over time and/or at different locations, trait analysis engine is able to identify or discover the scene traits that are most likely to aid in resolving the identity of objects captured by image sensor 107a. It is possible, in some cases, that a single scene trait is not sufficient for resolving ambiguity. However, a vector corresponding to several traits may resolve ambiguity even if one trait does not. For example, as discussed further below, principal component analysis (PCA) might reveal what direction the space variance is the greatest.

Feature set analyzer 123 analyzes feature sets 126 associated with various capture IDs to identify at least one similarity feature set 128. Feature set analyzer 123 identifies features that are similar across different capture IDs according to a similarity measure in the feature space. Similarity feature set 128 could be compiled through one or more techniques. In some embodiments, similarity feature set 128 can be derived based on clustering the features in feature set 126 (e.g., k-means clustering, etc.) where each cluster could be considered a similarity measure. Other similarity measures could include a threshold Euclidian distance from a cluster centroid or other point, a Mahalanobis distance, a Hamming distance, or even a feature space variance associated with a cluster. With respect to a cluster of similar features, the cluster might be quite defuse (i.e., have a large variance or distribution around the centroid of the cluster). In such a case, trait analysis engine 120 can apply a threshold boundary around the cluster and select features that fall within the boundary. The threshold boundary could be a priori defined or could be defined based on cluster features (e.g., centroid, variance, density, number of clusters, volume, etc.).

A threshold for similarity among features could be determined based on empirical evidence, for example, by analyzing numerous features associated with object 102 under different circumstances. For example, if the feature is an image descriptor associated with a face of a doll, a feature analysis engine monitors how the descriptor associated with doll face changes with the circumstance. The variance of the descriptor, or measured error, can be used to define acceptable similarity measures.

In one embodiment, trait analysis engine 120 seeks to discover which scene traits could be applied to the features to further distinguish similar features them from each other for object recognition purposes. This is achieved by trait analysis engine 120 leveraging scene traits 130 and, in one embodiment, applying the traits to the similar features in an attempt to resolve them from each other.

Trait variance analyzer 132 generates distinguishing traits 134 by analyzing trait variances of various scene traits 130 corresponding to the similar features in similarity feature set 128 with respect to one or more scene traits 130. In other words, the each of the features (e.g., SIFT or other descriptor) in similarity feature set 128 correspond to a particular set of traits captured for a particular scene 105 at a particular time, linked, as further explained in the context of FIG. 2, through a capture ID associated with both the digital representation from which the object descriptors were generated and with the trait values measured at the scene. As further illustrated in the context of FIG. 3, each dimension in a scene attribute space corresponds to a different trait (e.g., lighting, wireless signal values, GPS locations, magnetic fields, gravity direction etc.). Trait variance analyzer 132 determines which scene traits are most likely to have discriminating power. For example, trait variances could be derived based on applying principle component analysis (PCA) to generate a co-variance matrix. Trait variance analyzer 132 can use the co-variance matrix to derive variances in the space. Trait variance analyzer can apply machine learning algorithms and it can, in some embodiments, use past object recognition results to better identify distinguishing traits. Examples of trait variance analysis methods that could be implemented by trait variance analyzer 132 include, but are not limited to, the following: Bayesian Statistics; Cluster Analysis; Neural Networks; Support Vector Machines; Learning Automata; Random Forests; Gaussian Mixture Models; Fuzzy Learning; Expectation Maximization; and Vector Quantization. Those skilled in the art will appreciate that some of these techniques rely on externally received training data (e.g., with known object recognition data that has already been resolved and verified) for machine learning purposes while others would proceed to conduct variance analysis without the benefit of such guided training data.

Trait analysis engine 120 selects one or more of distinguishing scene traits 134 as a function of trait variances determined by variance analyzer 132. For example, trait analysis engine 120 can identify which trait variances determined by trait analyzer 132 have the greatest values, indicating that the corresponding scene trait 130 differentiates the features in similarity feature set 128 better than other scene traits 130. In some embodiments, trait analysis engine 120 selects distinguishing scene traits 134 based on which trait variances determined by analyzer 132 exceed a threshold value. Examples of distinguishing scene traits 134 could include a gravity vector, a wireless signal (e.g., received signal strength, etc.), an electro-magnetic field, a temperature, a depth of field, a gradient, a physical location, a relative position, an orientation, a restriction, a time, or other trait that can characterize the environment of object 102 in scene 105.

Weight processor 140 applies weights to the distinguishing traits based on the analysis performed by trait variance analyzer 132. Traits that are most likely to help resolve the descriptor data (e.g., those with higher variance) and recognize the corresponding object are given a higher weight. Weight processor 140 binds the weighted scene trait values as part of metadata with features (e.g., SIFT descriptors) corresponding to the same capture ID to form features and metadata sets 136. Trait analysis engine 120 stores features and metadata 136 in object recognition database 150 for future use by object recognition system 160. As discussed above with respect to types of distinguishing traits, it should be appreciated that the metadata stored along with the features could comprise a wide variety of data types. Examples of information that could be including within the metadata include location data, context data, time data, profile data, identity data, manufacturing data, model data, promotion data, healthcare data, or other types of data. Note that metadata in feature and metadata sets 136 may or may not directly represent weighted scene trait data. In some embodiments, metadata is determined from scene trait analysis, but is not expressed in terms of scene trait values. For example, scene weight processor might determine that particular locations in scene trait data are associated with likely categories of objects (e.g., apparel if an apparel department corresponds to scene location data) and then identify those categories through metadata to up weight results in the object recognition database that share that metadata.

The stored features can be stored in object recognition database 150 using numerous techniques. In some embodiments, the features are stored according to one or more tree structures; a k-d tree or spill tree, for example. Each feature in the tree can further include the distinguishing trait metadata (e.g., weighted traits. In other embodiments, the features could be stored as data objects according to an indexing system that leverages the distinguishing trait metadata. Yet other embodiments allow for storing the features as constellations of features within a space (e.g., feature space, descriptor space, attribute space, etc.). For example, the constellation of feature might exist within a descriptor space where all the features in the constellation also include trait values associated with distinguishing scene traits 134.

Object recognition system 160 can be configured or programmed to generate results sets based on a received query. In embodiments where system 160 receives a query that includes metadata, system 160 can filter stored features in database 150 according metadata associated with at least one distinguishing scene trait 134, such as, for example, location metadata. For example, a consumer's phone, which may, for example, house a sensor system that can analyze the image data and generate numerous image descriptors. The descriptors can be submitted to object recognition database 150, possibly embodied as a k-d tree or spill tree, to determine if there are known similar descriptors from previously ingested objects. In view of the fact that there can be many false positives; a smart phone can, in one embodiment, submit a query that binds the descriptors with additional metadata, perhaps location or time information obtained from the smart phone's sensors. In response, system 160 can filter relevant features from irrelevant features in database 150 by filtering features having locations that are too dissimilar to the smart phone's location.

Object recognition system 160 including object recognition database 150 is presented as a programmed device external to trait analysis engine 120. However, alternative configurations are also possible. For example, object recognition system 160 and database 150 could be a module within trait analysis engine 120 stored on one or more servers 101 that offer its services via a web service API for example. Further, object recognition database 150 could also comprises a standalone recognition module that can be installed on target devices; cell phones, smart phones, cameras, game consoles, medical devices, kiosks, or other computing devices. Object recognition database 150 could also be integrated as a library or module within applications so that the applications are enabled to recognize objects.

It should further be appreciated that object recognition database 150 does not necessarily store the features themselves per se. Rather, in more preferred embodiments, object recognition database 150 indexes content information based on the features and distinguishing trait information so that devices that consume the services offered by object recognition database 150 can quickly retrieve the content information based on observed features in the field and sensed scene traits. Example content information that can be indexed include network addresses, videos, images, promotions, apps or applications, security keys, map information, electronic medical records, software upgrades for toys, game features, or other types of content.

Trait analysis engine 120 is configured to receive object recognition results 161 from object recognition system 160 and store them for use by weight processor 140 and/or trait variance analyzer 132. Receiving object recognition results 161 allows trait variance analyzer and/or weight processor 140 to enhance implementation of machine learning techniques and facilitate automatic improvement of the accuracy of trait variance analyzer 132 and weight processor 140 over time.

Figure 2:
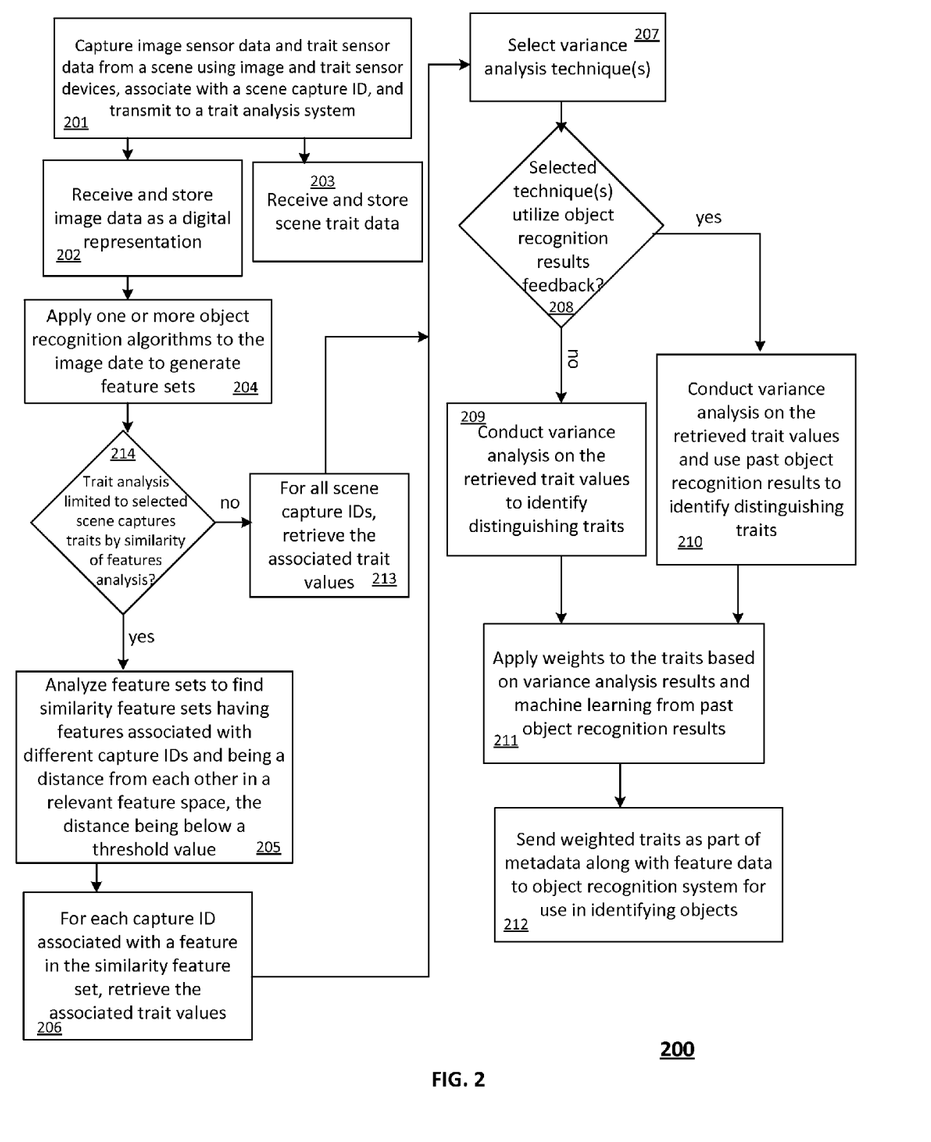
FIG. 2 is a flow diagram of processing implemented by the embodiment of FIG. 1.

FIG. 2 is a flow chart illustrating processing 200 carried out by devices of system 100 of FIG. 1. Step 201 captures image sensor data and trait sensor data from a scene such as, for example, scene 105 of FIG. 1. Step 201 also associates the image sensor data and the trait sensor data with a unique capture ID so that derived image descriptor information of objects such as object 102 can be correctly correlated by trait analysis engine 120 with corresponding trait information captured from scene 105 at the same time.

Step 202 receives image data at trait analysis engine 120 and stores it as a digital representation 122. Step 203 receives and stores scene trait data 130 at trait analysis engine 120. Step 204 applies one or more object recognition algorithms to the digital representation of the Image to derive appropriate feature sets (e.g., SIFT descriptors or other descriptors generated by the object recognition algorithms referenced above in the context of FIG. 1). In the illustrated embodiment, descriptors are generated from the image data by trait analysis engine 120. However, in alternative embodiments, descriptors could be generated at a client-side device associated with the image sensor and sent to the trait analysis engine 120 through network 115. Step 214 then determines whether trait analysis will be limited to traits associated with similar features or whether traits associated with all features will be analyzed. If the result of step 214 is no, then step 213 retrieves traits associated with all scene capture IDs. If the result of step 215 is yes, then step 205 analyzes features to find similarity feature sets comprising similar features associated with different capture IDs. Step 206, for each capture ID, retrieves corresponding scene trait data values. Processing 200 proceeds to step 207 from either 213 based or 206 (depending on the result of step 214). Step 207 selects one or more analysis techniques for analyzing trait variance to identify distinguishing traits. As discussed above with reference to FIG. 1, various techniques can be used for variance analysis. Step 208 determines whether the selected analysis technique utilizes object recognition results feedback. If yes, then step 210 conducts variance analysis based on trait value variances along various dimensions of an attribute space and uses received results from past object recognitions received from object recognition system 160 to identify distinguishing traits. If the result of step 208 is no, then step 209 conducts variance analysis based on the associated trait values only, along with any training data provided to the system. Note that in either case, machine learning techniques can be used in particular embodiments. Typical machine learning embodiments of the present invention will rely an initial training data as will be appreciated by those skilled in the art. Step 211 applies weights to the traits based on the results of the variance analysis (of either step 209 or step 210) and further in view of object recognition results received from object recognition system 160. Step 212 send weighted trait information as part of metadata bound to derived features (e.g., SIFT or other descriptors) of the image captured together with the relevant trait values (this can be determined through association with a capture ID). Note that the features sent for object recognition may, in a preferred embodiment, include more features than the features selected as part of feature similarity set 128 of FIG. 1. In some embodiments, some or all of the features in feature similarity set 128 are associated with different capture IDs and are used for identifying distinguishing traits that are expected to be helpful in resolving the descriptors from a single image (associated with a single capture ID). In other words, the features bound with metadata collected in features and metadata sets 136 will, for a particular data set submitted for a particular object recognition query, generally be associated with a same capture ID and may include descriptors associated with that capture ID that may or may not have also been selected as part of similarity feature sets 128.

Figure 3A:
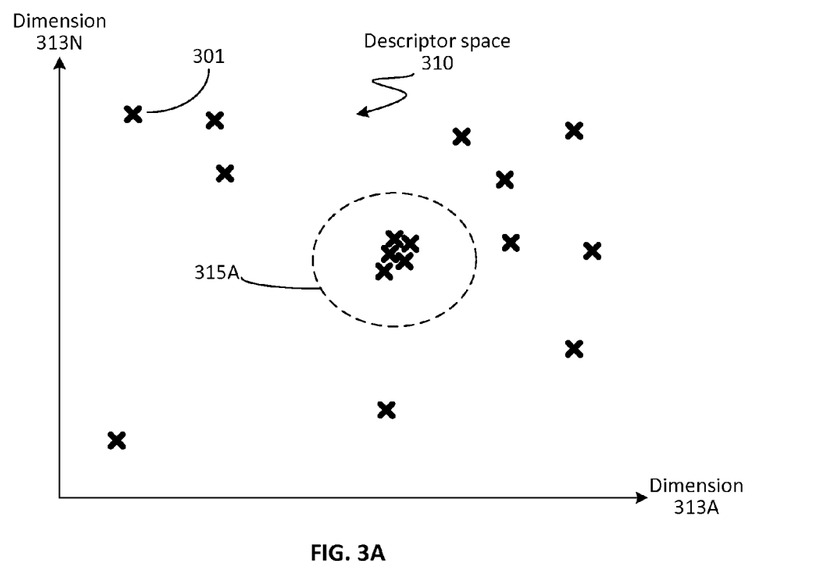
FIGS. 3A-3C illustrate differentiation of a set of similar features in a feature space (FIG. 3A) by discovering trait variances in a non-feature, scene attribute space (FIGS. 3B-3C.)
Figure 3B:
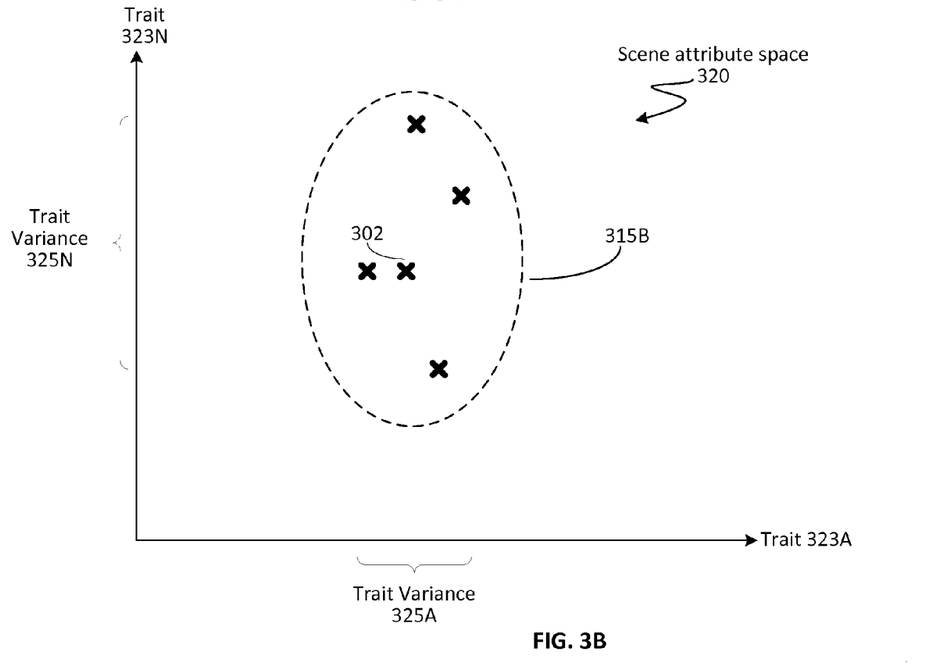
Figure 3C:
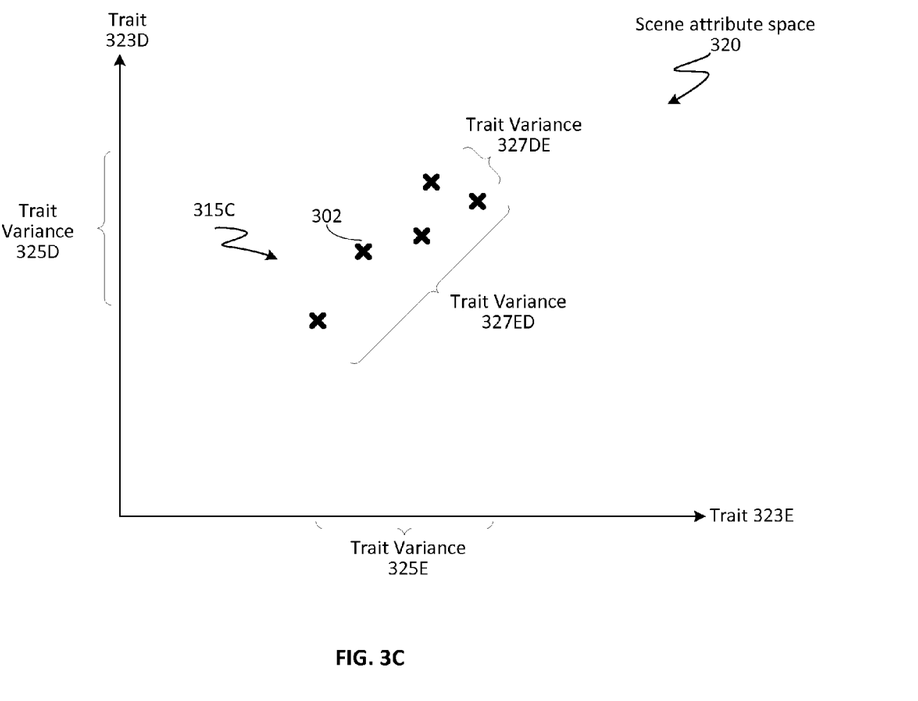

FIGS. 3A-3C provide a simplified graphical depiction of how trait analysis engine 120 can discover which scene traits aid in breaking the symmetry or similarity of similar features.

FIG. 3A depicts an exemplary feature space 310. Object recognition algorithms applied to digital image representation data generally express resulting descriptor values (features) as multi-dimensional values, i.e., vectors. These descriptors, depending on the algorithm, can be represented in a feature space with any practical number of dimensions (e.g., more than two dimensions). However, for clarity and ease of explanation, FIG. 3A illustrates only two dimensions of feature space 310. Specifically, as shown, feature space 310 includes dimension 313N and dimension 313A. Vector values 301 represent different descriptor values (with corresponding 313N and 313A dimension values) in feature space 310. Feature set analyzer 123 discovers similarity feature set 315A as having feature values 301 that are close to each other and are therefore considered similar. It should be appreciated that the features in similarity feature set 315A are not required to be identical. Rather, they are similar to each other with respect to their object resolving capabilities. Moreover, it is preferable that at least some of the feature values in similarity set 315A are associated with different capture IDs so that significant variances of at least some corresponding scene trait values is more likely.

In addition to binding traits to time and scene location through a capture ID, various other useful bindings are possible. For example, a descriptor (e.g., SIFT descriptor) could be bound to a key point having coordinates in an image. A descriptor (e.g., SIFT descriptor) could be bound to a key point having a depth reading from a depth sensor or to a key point having a depth reading from stereo reconstruction. Also various traits might be bound to different sensors. For example, absolute position can be revealed by various combinations of sensor readings and different binding relationships. For example, GPS location could be bound to a magnetometer reading, Wi-Fi received signal strength or Bluetooth received signal strength. Binding of magnetometer readings could be to a GPS location, Wi-Fi received signal strength or Bluetooth received signal strength. Binding of Wi-Fi received signal strength could be to GPS location, magnetometer readings or Bluetooth received signal strength. Binding of Bluetooth received signal strength could be to a GPS location, magnetometer readings or Wi-Fi received signal strength.

FIG. 3B illustrates an exemplary scene attribute (trait) space 320. For clarity and ease of description, only two dimensions of scene attribute space 320 are shown. However, any practical number of dimensions may exist for a relevant scene attribute space. The number of dimensions in scene attribute space 320 is unrelated to the number of dimensions in feature space 310. In scene attribute space 320, each dimension corresponds to a different trait. Trait 323N corresponds to a first dimension and Trait 323A corresponds to a second dimension. These may be any potentially useful scene traits captured together with the image data corresponding to features in similarity feature set 315A of FIG. 3A. To site just one example, trait 323N might be a Wi-Fi signal trait and trait 323A might be a lighting value trait. Alternatively, trait 323N might be a location trait derived from a group of traits such as a Wi-Fi signal, GPS information, a Bluetooth signal and/or magnetic field information.

In some embodiments, the trait analysis engine binds scene trait information to the similar features of similarity feature set 315A to form similarity feature set 315B in scene attribute space 320. In one embodiment, values 302 in trait space 320 are located using the capture ID(s) associated with captured images corresponding to the descriptors 301 in similarity feature set 315. The trait values associated with those capture IDs are plotted in space 320. In this example, there are five similar features that spread over space 320. However, any number of features could be present. The trait analysis engine can then determine the spread or variance of the features on a trait-by-trait basis within scene attribute space 320. Of note there are two variances respectively corresponding to traits 323A and 223N. Trait 323N has a variance 325N. Trait 323A has a trait variance 325A.

Trait variances 325A and 325N can be generated through various techniques as described previously. For example, the variances can be determined fitting the distribution of features in attribute space 320 to a Gaussian distribution and calculating the width of the distribution. Other distributions can also be leveraged including Poisson distributions, binomial distributions, lognormal distributions, Weibull distributions, or other types of distributions. Another approach to determine the variance or spread with respect to a trait is to determine the extent of the spread along the trait as shown (e.g., trait $A_2$-trait $A_1$, trait $N_2$-trait $N_1$). In scenarios where the distribution of similar features is bi-modal, it is contemplated there could be more than one variance with respect to a trait while still offering object resolving power. Trait variances 325A and 325N could be measured in units according to the traits, standard deviations, or other metrics.

In the example of FIG. 3B, trait variance 325N is significantly larger than trait variance 325A. Therefore, trait 323N would be expected to have more resolving power than trait 323A for successfully identifying the objects associated with similarity feature set 315A of FIG. 3A. In one example, weight processor module 140 of FIG. 1 would therefore weight trait 323N more than weight 323A when binding metadata to the feature sets associated with images corresponding to the descriptors of similarity feature set 315A of FIG. 3A.

FIG. 3C shows a plot of corresponding values along two different dimensions of scene attribute space 320. Values 302 are shown plotted along dimensions 323D and 323E, which represent two different scene traits than those shown in FIG. 3B. Similarity feature set 315C corresponds to values for scene traits 323D and 323E which in turn correspond to the same capture IDs that are associated with descriptors plotted in the similarity feature set 315A of FIG. 3A.

In the example of FIG. 3C, trait variance 325D is very similar in degree to trait variance 325E. Therefore, looking at these variances alone does not provide a strong basis for which of scene trait 323E or 323D to weight higher for purposes of creating corresponding metadata for features and metadata set 136 of FIG. 1. However, traits can also be correlated with each other such that variation of features in similarity feature set 315C with respect to one trait could be correlated with variation to one or more other traits. As illustrated there appears to be a strong correlation between trait 323D and trait 323E. If a feature has a high value for trait 323D then it is likely that the same feature will have a high value for trait 323E. The trait analysis engine can discover such correlation by conducting a principle component analysis, which will yield an N×N covariance matrix (i.e., N is the number of dimensions in scene attribute space 220). The eigenvalues of the covariance matrix indicate which correlations (i.e., eigenvectors) offer the greatest variance. In the example shown, trait variance 327ED offers greater resolving power than trait variance 327DE. Thus, the inventive subject matter is considered to include a trait analysis engine discovering which correlations among scene traits aid in distinguishing objects. For example, two traits that have strong covariance are more likely to help in distinguishing objects than are traits that do not exhibit strong covariance with any other traits. Therefore, in some embodiments, covariant traits are selected as distinguish traits and may be weighted more heavily when creating metadata than traits that exhibit little or no covariance.

Of particular interest, the features within similarity feature set 315C can be considered to form a constellation of features within scene attribute space 220 where the constellation can be constructed from the feature and at least of the distinguishing scene trait 323A though trait 323N. Each feature in the constellation can be bound with trait metadata indicating the arrangement or distribution of features with respect to the distinguishing traits. The trait metadata could include each feature's trait values, links to other features in the same constellation, a function that describes the trait values for the constellation, pointers to trait information, or other types of trait metadata. The constellation information can also be stored in the object recognition database to aid in resolving objects.

Without intending to in any way limit the invention, the following concrete example illustrates how the embodiments of the invention might be applied in a department store environment to leverage scene trait information in resolving similar descriptors for improving object recognition. In the following example, categories of expected items can be weighted in metadata associated with submitted descriptors, such metadata being added by weight processor 140 of FIG. 1 or by processing accomplished in object recognition system 160. A shopper in a department store might be less likely to be looking at apparel in the appliance section. Therefore scene traits that resolve location such as GPS, Bluetooth, Wi-Fi can be used to up weight a metadata item corresponding to appliances as an object class when the sensor data indicates that a corresponding image was captured in the appliance section and down weight other items such as apparel.

By way of another example, a table would most likely be standing on its legs. Therefore, the gravity vector from an accelerometer should be used to up weight images of tables standing on their legs and down weight table candidates that are not.

The disclosed subject matter gives rise to interesting features when devices in the field consume object recognition information from the object recognition database. One example includes identifying discrepancies between sensed scene trait information associated with observed features in the field relative to the distinguishing trait values for similar features in the database. Consider a scenario where features in the object recognition database include a temperature trait, perhaps the trait has a low value or represents a cold temperature, for a set of skis. In the field, a user might capture an image of a poster that illustrates the skis, but the local temperature is warm. The user's cell phone can detect the difference between the local scene traits (e.g., it is warm) and the ingested scene traits (e.g., it was or should be cold) in the database. The discrepancy can be used by the recognition engine as evidence that the captured image is of a poster rather than a real object. Such an approach provides for delivering proper content associated with the poster version of the skis (e.g., promotions, travel information, etc.) rather than the actual skis.

Figure 4:
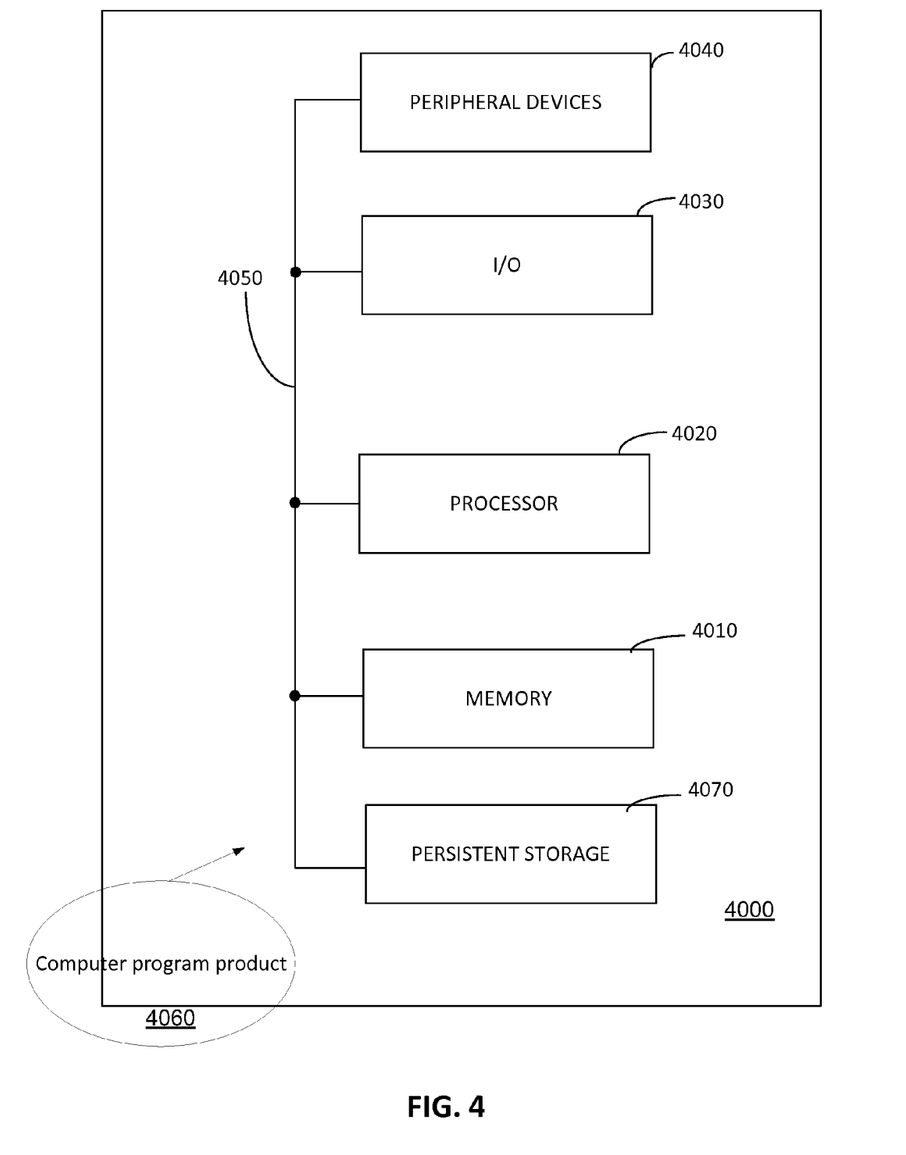
FIG. 4 shows an example of a computer system (one or more of which may provide the components of system 100 of FIG. 1) that may be used to execute instruction code contained in a computer program product in accordance with an embodiment of the present invention.

FIG. 4 shows an example of a computer system 4000 (one or more of which may provide the components of system 100 of FIG. 1) that may be used to execute instruction code contained in a computer program product 4060 in accordance with an embodiment of the present invention. Computer program product 4060 comprises executable code in an electronically readable medium that may instruct one or more computers such as computer system 4000 to perform processing that accomplishes the exemplary method steps performed by the embodiments referenced herein. The electronically readable medium may be any non-transitory medium that stores information electronically and may be accessed locally or remotely, for example via a network connection. The medium may include a plurality of geographically dispersed media each configured to store different parts of the executable code at different locations and/or at different times. The executable instruction code in an electronically readable medium directs the illustrated computer system 4000 to carry out various exemplary tasks described herein. The executable code for directing the carrying out of tasks described herein would be typically realized in software. However, it will be appreciated by those skilled in the art, that computers or other electronic devices might utilize code realized in hardware to perform many or all of the identified tasks without departing from the present invention. Those skilled in the art will understand that many variations on executable code may be found that implement exemplary methods within the spirit and the scope of the present invention.

The code or a copy of the code contained in computer program product 4060 may reside in one or more storage persistent media (not separately shown) communicatively coupled to system 4000 for loading and storage in persistent storage device 4070 and/or memory 4010 for execution by processor 4020. Computer system 4000 also includes I/O subsystem 4030 and peripheral devices 4040. I/O subsystem 4030, peripheral devices 4040, processor 4020, memory 4010, and persistent storage device 4060 are coupled via bus 4050. Like persistent storage device 4070 and any other persistent storage that might contain computer program product 4060, memory 4010 is a non-transitory media (even if implemented as a typical volatile computer memory device). Moreover, those skilled in the art will appreciate that in addition to storing computer program product 4060 for carrying out processing described herein, memory 4010 and/or persistent storage device 4060 may be configured to store the various data elements referenced and illustrated herein.

Those skilled in the art will appreciate computer system 4000 illustrates just one example of a system in which a computer program product in accordance with an embodiment of the present invention may be implemented. To cite but one example of an alternative embodiment, execution of instructions contained in a computer program product in accordance with an embodiment of the present invention may be distributed over multiple computers, such as, for example, over the computers of a distributed computing network.

The invention is not necessarily limited to any of the particular embodiments presented herein. Those embodiments are meant only for illustrating the operation of principles of the present invention. However, the invention itself is only limited by the broadest spirit and scope consistent with the underlying inventive principles referenced herein and the claims appended hereto.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An object recognition trait identification system comprising:
   a computerized scene trait database storing a plurality of scene traits having values representative of a scene, the scene traits existing within a scene attribute space;
   a trait analysis engine coupled to the scene trait database comprising:
      an object recognition processor comprising circuitry configured by executable instruction code to accept at least a portion of a digital representation as input and derive a plurality of features by applying a recognition algorithm to the digital representation of an object in a scene, the plurality of features existing in a feature space;

a feature set analyzer comprising circuitry configured by executable instruction code to generate trait variances with respect to the scene traits in the scene attribute space for features within at least one similarity feature set, wherein a feature corresponds to at least one scene trait; and a trait variance analyzer compromising circuitry configured by executable instruction code to select at least one distinguishing scene trait from the scene traits as a function of the trait variances where the at least one distinguishing scene trait differentiates features within the at least one similarity feature set; and an object recognition database coupled to the trait analysis engine and storing each feature in the similarity feature set along with metadata that includes the at least one distinguishing scene trait.

2. The system of claim 1 wherein the trait analysis engine is further configured to compile at least one similarity feature set comprising features of the plurality of features considered similar according to a similarity measure within the feature space.

3. The system of claim 1, wherein at least some of the scene traits are representative of a controlled environmental setting as the scene.

4. The system of claim 3, wherein the at least some of the scene traits comprise adjustable parameters within the controlled environment setting.

5. The system of claim 1, wherein at least some of the scene traits are representative of ambient sensor data of the scene.

6. The system of claim 5, wherein ambient sensor data is representative of external scene sensor data.

7. The system of claim 1, wherein the digital representation comprises at least one of the following data modalities: image data, video data, audio data, 3D data, sensor data, location data, time data, biometric data, and game data.

8. The system of claim 1, wherein the digital representation of the object includes a representation of an object class.

9. The system of claim 1, wherein the digital representation of the object includes a representation at least one of the following: a toy, a vehicle, a craft, an animal, a plant, a human, an appliance, a device, a document, a financial instrument, a game component, a poster, a newspaper, a magazine, and on screen content.

10. The system of claim 1, wherein the plurality of features includes at least one of the following features: a descriptor, a key point, a signature, and an envelope.

11. The system of claim 1, wherein the object recognition processor includes an image processing algorithm.

12. The system of claim 11, wherein the image processing algorithm includes at least one of the following,: SIFT, BRISK, SURF, FERNS, DAISY, GLOH, FAST, OCR, FREAK, HOG BRIEF, Harris Corners detector, EOG, TILT and facial recognition.

13. The system of claim 1, wherein the object recognition processor includes a sound processing algorithm.

14. The system of claim 2, wherein the similarity measure includes at least one of the following: clustering, a Euclidean distance, a Mahalanohis distance, a Hamming distance and a feature space variance.

15. The system of claim 2, wherein the trait analysis engine is further configured to compile at least one similarity feature set comprising features that fall within a threshold boundary with respect to the similarity measure.

16. The system of claim 1, wherein the trait variances are variances with respect to the scene attribute space.

17. The system of claim 1, wherein the trait analysis engine is further configured to select at least one distinguishing scene trait from the scene traits based on the scene traits having variances greater than a threshold.

18. The system of claim 1, wherein the trait analysis engine is further configured to construct at least one constellation of features from the at least one similarity feature set and the distinguishing scene traits.

19. The system of claim 18 wherein the at least one constellation of features is specific to the distinguishing scene trait.

20. The system of claim 18, wherein the at least one constellation of features includes multiple constellations where each constellation includes trait metadata representing one or more distinguishing scene traits.

21. The system of claim 1, wherein the object recognition database is configured to filter stored features according the metadata that includes the at least one distinguishing scene trait.

22. The system of claim 18, wherein the object recognition database is configured to return results sets as feature constellations based on the at least one distinguishing scene trait.

23. The system of claim 1, wherein the metadata further includes at least one of the following beyond the at least one distinguishing scene trait: location data, context data, time data, profile data, identity data, manufacturing data, model data, promotion data, and healthcare data.

24. The system of claim 1, wherein the distinguishing scene trait includes gravity.

25. The system of claim 1, wherein the distinguishing scene trait includes at least one of the following: a wireless signal, an electro-magnetic field, a temperature, a gradient, a physical location, a relative position, an orientation, a restriction, and a time.

* * * * *